UNITED STATES PATENT OFFICE.

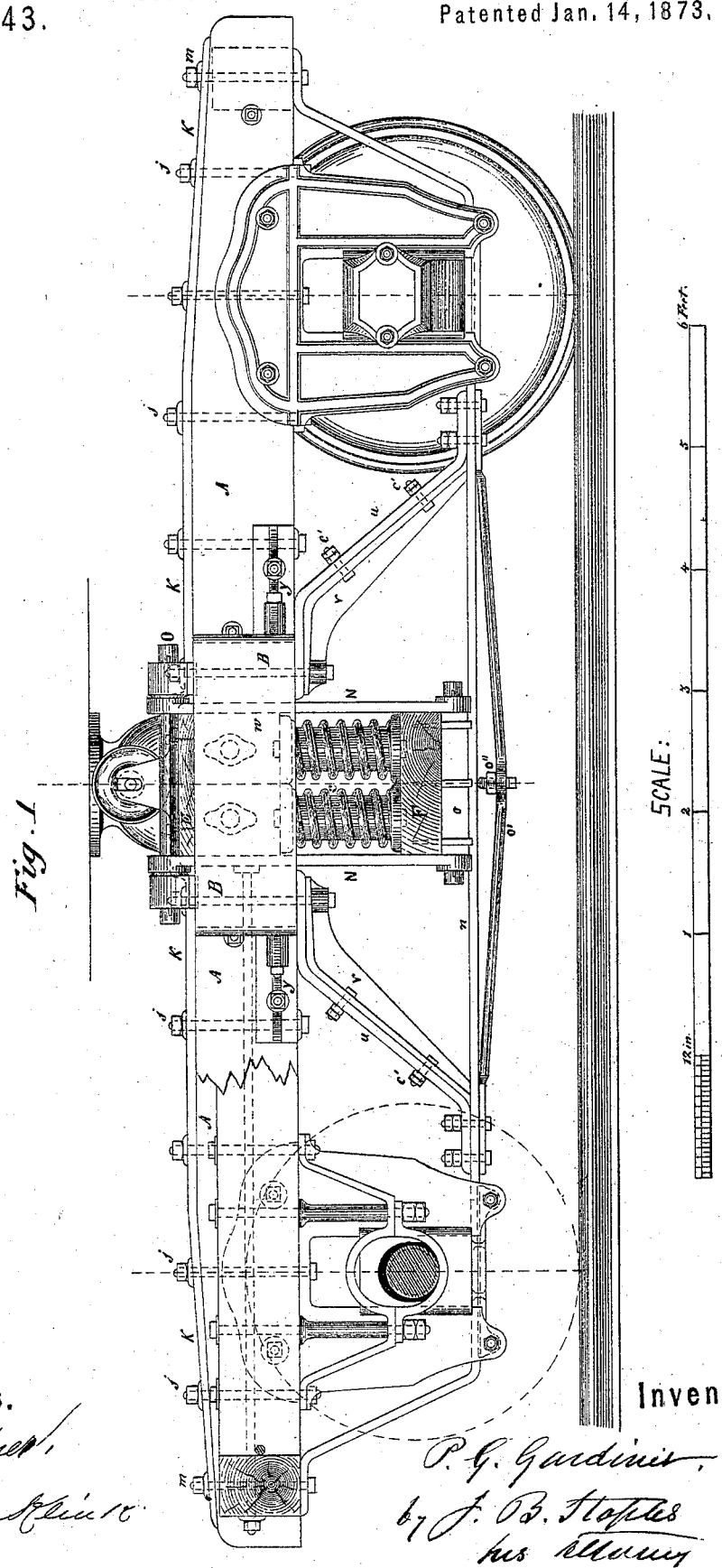

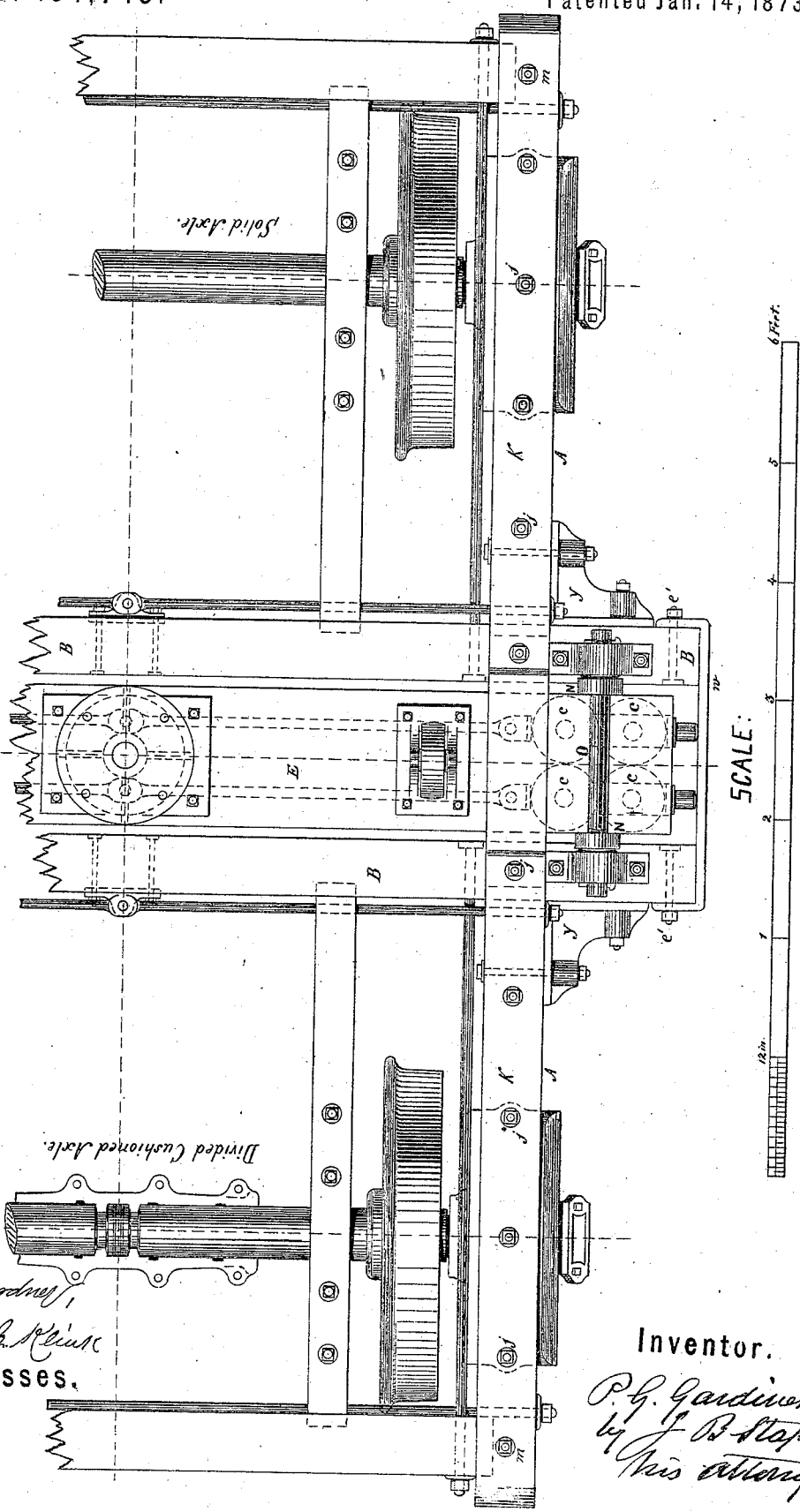

PERRY G. GARDINER, OF NEW YORK, N. Y.

IMPROVEMENT IN RAILROAD-CAR TRUCKS.

Specification forming part of Letters Patent No. 134,743, dated January 14, 1873.

*To all whom it may concern:*

Be it known that I, PERRY G. GARDINER, of the city and county and State of New York, have invented new and useful Improvements in Railroad-Car Trucks, of which the following is a specification:

My invention and improvements consist, first, in constructing the truck in two sections, with extended transom - beams and bolster swung between the same in the space between the said sections; secondly, in the manner of trussing, supporting, and securing the truck-frame thus divided, so as to give it the necessary strength and stability and prevent any sagging at the line of section.

In the accompanying drawing, Plate I represents a side elevation of a railroad-car truck embodying my said invention and improvements; Plate II represents a top or plan view of one side of the same.

In both the plates or figures similar letters represent similar parts.

In the drawing the side timbers of the truck-frame are shown at A A. In trucks as ordinarily constructed this side timber is in one piece extending the whole length of the truck. In my improved construction these side timbers are divided, and their ends thus divided are connected by the transoms B B, which are firmly secured to the ends of the side timbers. These transoms are arranged at such a distance apart as to admit the bolster E, which is also extended outside or beyond the sides of the truck-frame. The transoms and the bolsters extend laterally outside the side timbers of the truck sufficiently to give space to place the body-springs and the bearings of the bolster, or the links and link-rod which support the sand-board, outside the truck-frame. $c\ c$ are the body-springs resting upon the sand-board F supported on the transoms B by the links N and cross upper link-rods O, and by the cross link-rods $o$ beneath. (Plate I.) By this construction and arrangement the bearings of the body-springs on either side are spread apart from the center of the lateral movement of the car as far as the width of the car itself will admit, instead of having the bearings within the sides of the truck-frame, as is the usual construction. This arrangement gives the required stability to the car, and prevents the unpleasant and dangerous swaying of the car when the train is turning a curve in rapid motion; it also causes the car to move more steadily and uniformly, and the increased distance apart of the bearings of the bolster counteracts the tendency to throw the weight on one side of the bearings and body-springs, which, in the ordinary construction, takes place at all times when the cars are in rapid motion, and which injures or destroys the springs, and is uncomfortable as well as dangerous to the passengers in the cars.

In order to give sufficient strength and stability to the truck thus constructed I provide iron trusses and straps, which connect and unite strongly together the parts of the truck-frame separated as above described.

In Plate I are shown the diagonal wrought-iron knee-trusses $u$, which are bolted to the cast-iron knee-truss $v$, by the bolts $c'$. The upper ends of $u\ v$ are firmly bolted to the under sides of the transom-beam B; the lower ends of $u\ v$ are bolted and firmly secured to a horizontal pedestal-strap $n$, which extends from pedestal to pedestal on either side, and is secured at the bottom of each pedestal to the pedestal; and, for the sake of further strengthening the connection, I carry the pedestal-strap beyond the foot of the pedestal up to the under side of the end timbers of the truck, where it is firmly secured by the bolt $m$. Along the under side of the pedestal-strap I arrange the truss or jack bar $o'$, which is secured at its ends at the lower ends of the diagonal trusses $u\ v$, and in the middle of the truss-bar I arrange the vertical jack or tightening screw $o''$, by the operation of which a greater tension may be produced of the pedestral-strap $n$, whereby the pedestals are drawn toward each other, and the diagonal braces or knee trusses $u\ v$ are forced upward so as to raise the transoms, and any sagging or tendency to sagging of the truck from the weight upon the bolster bearings will be prevented or corrected. At the angles formed by the projection of the ends of the transom-beams beyond the line of the side timbers of the trucks, I place cast-iron corner-braces $y$, which are firmly bolted so as to secure the transoms and side timbers together. Angle-pieces of wrought-iron $w\ w$ connect the transoms at the ends, and are secured to the transoms at their sides by the bolts $e'\ e'$, Plate II. Along the upper faces of the side timbers of the truck is bolted the wrought-iron strap $k$ by the bolts $j$, and which extends the whole length of the side timbers of the truck, for strengthening and securing the parts together, Plate II.

The parts of the drawing not herein referred to represent wheels, axles, (divided and solid,) crown-plate, king-bolt, bolster-buffers, springs, and other parts common to railway-car trucks of the usual construction, but which, as they do not relate specially to my present invention and improvements, I do not here particularly describe or refer to.

What I claim as my invention and improvement herein, and for which I desire Letters Patent, is—

1. A truck composed of two sections, A A, having extended transoms B B secured to the inner side of each section, and between the same the swinging bolster E, the bolster-springs $c\ c$ connecting the sand-board and bolster being hung outside of the body of the truck, constructed and operating in the manner and for the purposes set forth.

2. In combination with the truck-frame in sections, as above described, the truss-rods $u\ v$ connecting pedestal-straps $n$, the truck or jack-bar V, and bracing or adjusting screw $o''$, arranged and operating substantially in the manner and for the purposes described.

P. G. GARDINER.

Witnesses:
C. TH. WAGNER,
S. A. STODDER.